United States Patent [19]

Holdar

[11] Patent Number: 4,854,973

[45] Date of Patent: Aug. 8, 1989

[54] LOW ODOR CARBON AND PAINT REMOVER COMPOSITION

[75] Inventor: Robert M. Holdar, Irving, Tex.

[73] Assignee: NCH Corporation, Irving, Tex.

[21] Appl. No.: 281,946

[22] Filed: Dec. 6, 1988

Related U.S. Application Data

[60] Continuation of Ser. No. 34,686, Apr. 6, 1987, abandoned, Division of Ser. No. 774,922, Sep. 11, 1985, abandoned.

[51] Int. Cl.$^4$ .......................... B08B 3/08; C09D 9/00; C09D 9/04; C11D 3/44
[52] U.S. Cl. ......................................... 134/39; 134/38; 252/153; 252/162; 252/170; 252/171; 252/172; 252/DIG. 8
[58] Field of Search .............................. 134/39, 38, 40; 252/153, 162, 170, 171, 172, DIG. 8

[56] References Cited

U.S. PATENT DOCUMENTS

| | | | |
|---|---|---|---|
| 1,924,722 | 8/1933 | Lovell | 252/153 |
| 2,032,174 | 2/1936 | Johnson | 134/39 |
| 2,418,908 | 4/1947 | Skinner | 252/118 |
| 2,626,225 | 1/1953 | Brandes | 134/20 |
| 2,700,005 | 1/1955 | Klingel | 134/22 |
| 2,704,733 | 3/1955 | Pearsall | 134/20 |
| 2,904,458 | 9/1959 | Dykstra | 134/20 |

OTHER PUBLICATIONS

Bennett, H., Ed., *The Chemical Formulary*, vol. XI, published by the Chemical Publishing Co., New York, 1961, p. 317.

Bennett, H., Ed., *The Chemical Formulary*, vol. XVI, published by The Chemical Publishing Co., New York, 1971, p. 76.

*Primary Examiner*—Dennis Albrecht
*Attorney, Agent, or Firm*—Bernard A. Reiter; Mark G. Bocchetti

[57] ABSTRACT

Low odor carbon and paint remover compositions useful in the removal of carbon build-ups and paint coatings and films from surfaces such as those associated with the combustion of fuels are disclosed which consists essentially of from about 45 to about 90 volume percent of a short chain chlorinated hydrocarbon, from about 3 to about 30 volume percent of a short chain dialkylamide, from about 1 to about 5 volume percent of a suitable surfactant, and from about 2 to about 20 volume percent of water. These compositions are corrosion resistant and ecologically safe, and may also include mixtures of polar and non-polar organic solvents with a blend of cationic and non-ionic surfactants and corrosion inhibitors.

11 Claims, No Drawings

LOW ODOR CARBON AND PAINT REMOVER COMPOSITION

This is a continuation of co-pending application Ser. No. 034,686 filed on Apr. 6, 1987, now abandoned, which is a division of application Ser. No. 774,922 filed Sept. 11, 1985, now abandoned.

BACKGROUND OF THE INVENTION

This invention relates generally to formulations useful in the removal of carbon build-ups and paint coatings. More particularly, the present invention relates to cleaning compositions utilizing short chain chlorinated hydrocarbons as a solvent base which are useful in the removal of paint films and carbon deposits from surfaces associated with combustion fuels.

Description of the Prior Art

The operation of internal combustion engines, particularly those which are poorly maintained, results in build-ups of high carbon content residues which, inevitably, interfere with operational efficiency. In order to avoid the time and expense which accompanies the mechanical removal of these residues, various types of solvent systems have been developed. Most carbon removal solvent formulations disclosed in the prior art utilize phenols, cresols, aromatic hydrocarbons, or mixtures of these components. Substantially all such formuations contain high pH levels. These compounds present undesirable odor and disposal problems, and the high pH of the formulations often results in corrosive attacks on aluminum, magnesium, and zinc articles.

U.S. Pat. Nos. 1,924,722 (Lovell, et al.); 2,006,636 (Gerlach); and 2,704,733 (Pearsall) are generally representative of the state of the art as it relates to the removal of carbon deposits from internal combustion engines and engine parts. While the formulations disclosed in these references may or may not be effective in removing carbon deposits, they generally present significant odor, corrosion and disposal problems due to the high content and toxicity of the aromatics solvents employed.

The art has also disclosed various formulations for paint and coating removers and strippers having short chain chlorinated hydrocarbon solvent constituents wherein aliphatic monohydric alcohols and other additives are utilized, such as for example, in U.S. Pat. Nos. 2,548,766 (Baum et al); 3,554,917 (Buckman et al); 3,075,923 (Berst et al); 3,625,763 (Melillo); 3,681,251 (Morison); 3,702,304 (Esposito); 3,789,007 (Robinson); 4,056,403 (Cramer); 4,278,557 (Elwell); 4,285,827 (Wyatt); 4,309,322 (Desmarais); 4,426,311 (Vander Mey); 4,383,867 (Elwell); and 4,438,192 (Archer et al).

As is the case with the above-described carbon remover compositions, the formulations for paint and coating removers also utilize or employ various phenolic compounds, such as phenols or cresols, or aromatic compound such as benzene in proportions which produce highly toxic formulations. Further, these formulations are undesirably odorous and corrosive.

Summary of the Invention

It is therefore an object of the present invention to provide cleaning compositions utilizing a short chain chlorinated hydrocarbon as their major constituent which are useful in the removal of paint films and carbon deposits from surfaces associated with combustion fuels.

It is another object of the present invention to provide cleaning compositions utilizing methylene chloride as their major constituent which are substantially odorless, corrosion resistant, and ecologically safe.

It is yet another object of the present invention to provide novel cleaning compositions which are devoid, or substantially devoid, of phenolic compounds, such as phenols or cresols, and aromatic compounds such as benzene.

It is a further object of the present invention to provide novel cleaning compositions which are of low toxicity so as to overcome the disadvantages of prior art compositions plagued with noxious odors, corrosive draw backs, and disposal problems.

These and other objects of the present invention are achieved through the provision of low odor cleaning compositions useful in the removal of paint films and carbon deposits from surfaces such as those associated with the combustion of fuels, said compositions consisting essentially of:

(a) from about 45 to about 90 volume percent of a short chain chlorinated hydrocarbon, (b) from about 3 to about 30 volume percent of a short chain diakylamide, (c) from about 1 to about 5 volume percent of a suitable surfactant, and (d) from about 2 to about 20 volume percent of water.

The formulations disclosed herein may also include mixtures of polar and non-polar organic solvents with a blend of cationic and non-ionic surfactants and corrosion inhibitors.

DETAILED DESCRIPTION OF THE INVENTION

The presently disclosed cleaning compositions contemplate the utilization of short chain, chlorinated organic solvents as the active carbon and paint remover solvent constituent, such as for example, methylene chloride, ethylene chloride, perchloroethylene and the like since such solvents are known to possess particularly good carbon and paint remover qualities.

It has been found that the addition of short chain, aliphatic amides further enhance the solvent action of the preferred chlorinated organic solvents. Among such compounds may be mentioned, for example, short chain dialkylamides such as dimethylformamide, diethyl formamide, dipropyl formamide, dimethyl acetamide, diethyl acetamide, dipropyl acetamide, N-methyl-N-ethyl formamide, N-methyl-N-ethyl formamide, dimethyl propionamide, N-ethyl-N-methyl propionamide, diethyl propionamide, N-propyl-N-ethylpropionamide, N-propyl-N-methylpropionamide, diisopropyl formamide, isopropyl ethyl formamide, isopropylmethyl formamide, n-propyl isopropyl formamide, diisopropyl acetamide, isopropylmethyl acetamide, isopropylethyl acetamide, n-propyl isopropyl acetamide, disopropyl propionamide, isopropylethyl propionamide, isopropylethyl propionamide, isopropylmethyl propionamide, and n-propyl isopropyl propionamide and the like.

The carbon and paint removal characteristics of the chlorinated solvents may optionally be further reinforced by mixtures of polar and non-polar organic solvents.

The group includes aliphatic monohydric alcohols, alkyl ketones, aromatic hydrocarbons, and cyclic aliphatic ethers. Among these compounds may be mentioned, for example, methanol, ethanol, propanol, isopropanol, methyl ethyl ketone, diethyl ketone, methyl isobutyl ketone, chlorobenzene, ortho dichlorobenzene, acetophenon, o-xylene, m-xylene, p-xylene, toluene, ethyl benzene, tetrahydrofuran, 1,4 dioxane and furan or the like.

It has also been found that the carbon and paint coating removal properties of these compositions are further improved by the addition of a surface-active agent. Among the surface-active agents which have been found to be of particular utility are the sodium salts of sulfonated oleic acid, oxyethylated amines, polyoxyethylated rosin amines, alkyl aryl sulfonic acids, linear alkyl aryl sulfonic acids, dodecylbenzene sulfonic acid, the imidazolidines, and Alrosperse 100 ™, a proprietary blend of fatty acids condensates.

Carbon Removal

In each of the following examples, the disclosed formulations were tested for carbon removal using a uniform carbonized film prepared by spreading a simple bentone grease on steel panels, and baking these panels at 400° F. for 72 hours. Several panels were exposed to room temperature baths of each of the following formulations for a period of thirty (30) minutes. An "A" rating was given to each formulation wherein the top layer and underlying layers underwent solvation. A "B" rating was given to each formulation wherein the top layer underwent solvation, and the underlying layer softened such that it could be removed with agitation. Lastly, a "C" rating was given to each formulation wherein the top layer underwent solvation, but the underlying layer was not completely softened such that it could be removed with either agitation or normal water pressure.

The comparison product utilized was CTD-99 ®, cresylic acid based formulation of solvents, emulsifiers, penetrating agents, and rust inhibitors produced commercially by National Chemsearch, Irving, Tex., a division of NCH Corporation.

(2) Certi-Kote 500 ® white enamel paint, a product of Certified Laboratories, Fort Worth, Tex., a division of NHC Corporation, (3) A gray alkyd enamel paint, and (4) A brown, phenolic-formaldehyde thermoset chemical resistant coating.

The comparison product utilized was CTD-99 ®, cresylic acid based formulation of solvents, emusifiers, penetrating agents, and rust inhibitors produced commercially by National Chemsearch, Irving, Tex., a division of NHC Corporation.

Paint removal capabilities of the instant formulations were given ratings of 1 through 4 (1-excellent, 2-good, 3-fair and 4-poor). The performance ratings for each formulation on each of the coatings were then combined so as to provide an overall paint removal rating.

| Formulations | 1 | 2 | 3 | 6 | 7 | 8 | 9 | CTD-99 ® |
|---|---|---|---|---|---|---|---|---|
| Dura Bond 238 ® | 1 | 1 | 1 | 1 | 1 | 1 | 1 | 1 |
| Certi-Kote 500 ® | 1 | 1 | 1 | 1 | 1 | 1 | 1 | 1 |
| Gray Alkyl Enamel | 1 | 2 | 1 | 2 | 2 | 1 | 2 | 3 |
| Brown, phenolic-formaldehyde thermoset chemical resistant coating | 1 | 4 | 2 | 2 | 2 | 1 | 1 | 1 |
| Overall Rating | 4 | 8 | 5 | 6 | 6 | 4 | 5 | 6 |

Conclusion

The above comparison tests indicate that most of the product variations tested equaled or exceeded the performance capabilities of the comparison product, while obviating the odor, disposal, and corrosion problems of the test product. 9n

I claim:

1. A method for removing carbon deposits from surfaces resulting from combustion of fuels such as carbon deposits which accumulate as a result of the operation of internal combustion engines comprising:

| Ratings | A | C | A | C | C | B | A | B | C | B | B | B |
|---|---|---|---|---|---|---|---|---|---|---|---|---|
| Formulations # | 1 | 2 | 3 | 4 | 5 | 6 | 7 | 8 | 9 | 10 | 11 | 12 |
| Methylene Chloride | 75 | 65 | 65 | 60 | 60 | 60 | 60 | 70 | 74 | 92 | 50 | 73 |
| Dimethyl Formamide | 5 | 10 | 10 | 10 | 10 | 10 | 10 | 5 | 5 | 5 | 16 | 5 |
| Alrosperse 100 ™ | 5 | 5 | 5 | 5 | 5 | 5 | 5 | 5 | 1 | 1 | 3 | |
| Water | 15 | 15 | 15 | 15 | 15 | 15 | 15 | 15 | 15 | 2 | 20 | 15 |
| Methanol | | 5 | | 5 | 5 | | | | | | | |
| O—dichlorobenzene | | | 5 | 5 | | 5 | 5 | | | | | |
| Xylene | | | | | 5 | | 5 | | | | | |
| Tetrahydrofuran | | | | | | | | 5 | 5 | | 11 | |
| Methylisobutyl Ketone | | | | | | 5 | | | | | | |
| Tall Oil Fatty Acid | | | | | | | | | | | | 3 |
| Fatty Acid Imidazoline | | | | | | | | | | | | 2 |
| Diethanolamine | | | | | | | | | | | | 2 |

*Comparison product was CTD-99 ®, National Chemsearch cresylic acid formulation of solvents, emulsifiers, penetrating agents and rust inhibitors. CTD-99 ® is utilized for the removal of paint, grease and carbon from metallic surfaces without the use of heat. CTD-99 ® is a registered trademark of NCH Corporation. CTD-99 ® achieved a "B" rating.

Paint Removal

Formulations 1, 2, 3, 6, 7, 8 and 9 were then tested for their effectiveness in removing paint from metallic surfaces without the use of heat. Paint coatings used were:

(1) Dura Bond 738 ® Rust-X primer, a product of National Chemsearch, Irving, Tex., a division of NCH Corporation, (a) immersing the surface containing carbon deposits in a mixture from about 45% to about 90% by volume of a short chain chlorinated hydrocarbon, 3% to 30% by volume of a short chain dialkylamide, 1% to 5% by volume of surfactant and 2% to 20% by volume of water, said mixture being substantially free of phenolic and aromatic compounds.

2. A method for removing carbon deposits from surfaces such as those carbon deposits which accumulate as a result of the operation of internal combustion engines as recited in claim 1 wherein:

said short chain dialkylamide is selected from the group consisting of dimethyl formamide, diethyl acetamide, dipropyl formamide, dimethyl acetamide, dipropyl acetamide, N-methyl-N-ethyl formamide, N-methyl-N-ethyl acetamide, dimethyl propionamide, N-ethyl-N-methyl propionamide, diethyl propionamide, N-propyl-N-methyl propionamide, diisopropyl formamide, isopropyl ethyl formamide, isopropylmethyl formamide, N-propyl isopropyl formamide, diisopropyl acetamide, isopropylmethyl acetamide, isopropylethyl acetamide, N-propyl-N-isopropyl acetamide, disopropyl propionamide, isopropiethyl propionamide, isopropyl-methyl propionamide and N-isopropyl propionamide.

3. A method for removing carbon deposits from surfaces resulting from combustion of fuels such as those carbon deposits which accumulate as a result of the operation of internal combustion engines comprising the steps of:

(a) immersing the surface containing carbon deposits in a mixture of 45% to 90% by volume of a short chain chlorinated hydrocarbon, 1% to 5% by volume of surfactant, 2% to 20% by volume of water and 3% to 30% by volume of a short chain dialkylamide selected from the group consisting of dimethyl formamide, diethyl formamide, dimethyl acetamide, diethyl acetamide, N-methyl-N-ethyl formamide, and N-methyl-N-ethyl acetamide, said mixture being substantially free of phenolic and aromatic compounds;

(b) agitating the solvated carbon deposits.

4. A method for removing carbon deposits from surfaces resulting from combustion of fuels such as those carbon deposits which accumulate as a result of the operation of internal combustion engines comprising the steps of:

(a) immersing the surface containing carbon deposits in a mixture for about 3% to about 30% by volume of dimethyl formamide, from about 2% to 20% by volume of water, from about 1% to about 5% by volume of surfactant and from about 45% to about 90% by volume of a short chain chlorinated hydrocarbon selected from the group consisting of methylene chloride, ethylene chloride, and percholoroethylene, said mixture being substantially free of phenolic and aromatic compounds;

(b) agitating the solvated carbon deposits.

5. A method for removing carbon deposits from surfaces such as those carbon deposits which accumulate as a result of the operation of internal combustion engines as recited in claim 4, wherein:

the short chain chlorinated hydrocarbon is selected from the group consisting of methylene chloride, ethylene chloride, and perchloroethylene.

6. A method for removing carbon deposits from surfaces such as those carbon deposits which accumulate as a result of the operation of internal combustion engines as recited in claim 3, 4 or 1, wherein:

the surfactant present in the mixture used in said immersing step is selected from the group consisting of sodium salt of sulfonated oleic acid, oxyethylated amines, polyoxyethylated amines, alkyl aryl sulfonic acids, dodecylbenzene sulfonic acids, imidazolidines, aklkanolamine salts of tall oil fatty acid, and mixtures of fatty acid condensates.

7. A method for removing carbon deposits from surfaces such as those carbon deposits which accumulate as a result of the operation of internal combustion engines as recited in claims 3, 4 or 1 wherein:

(a) said mixture also includes from about 0% to about 11% by volume mixtures of polar and/or non-polar organic solvents, said mixtures of polar and/or non-polar organic solvents selected from the group consisting of methanol, ethanol, propanol, isopropanol, methylethyl ketone, diethyl ketone, methyl isobutyl ketone, tetrahydrofuran, 1,4-dioxane and furan.

8. A method for removing carbon deposits from surfaces such as those carbon deposits which accumulate as a result of the operation of internal combustion engines as recited in claim 7, wherein:

said polar and/or non-polar organic solvents are blended with from about 0% to about 7% by volume cationic and/or non-ionic surface active agents and corrosion inhibitors.

9. A method for removing carbon deposits from surfaces such as those carbon deposits which accumulate as a result of the operation of internal combustion engines as recited in claim 3, 4 or 1 wherein:

said mixture of said immersing step also includes from about 0% to about 11% by volume mixtures of polar and/or non-polar organic solvents.

10. A method for removing carbon deposits from surfaces such as those carbon deposits which accumulate as a result of the operation of internal combustion engines as recited in claim 9, wherein:

the polar organic solvent is selected from the group consisting of methanol and methyl isobutyl ketone.

11. A method for removing carbon deposits from surfaces such as those carbon deposits which accumulate as a result of the operation of internal combustion engines as recited in claim 9 wherein:

said polar and/or nonpolar organic solvents are blended with from about 0% to about 7% by volume cationic and/or non-ionic surface active agents and corrosion inhibitors.

* * * * *